United States Patent
Nam et al.

(10) Patent No.: US 10,684,505 B2
(45) Date of Patent: Jun. 16, 2020

(54) TUNABLE ELECTRO-OPTIC FILTER

(71) Applicant: SAMSUNG ELECTRONICS CO., LTD., Suwon-si (KR)

(72) Inventors: Sunghyun Nam, Yongin-si (KR); Seokho Yun, Hwaseong-si (KR); Jesada Ungnapatanin, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 132 days.

(21) Appl. No.: 15/405,916

(22) Filed: Jan. 13, 2017

(65) Prior Publication Data
US 2017/0199425 A1    Jul. 13, 2017

(30) Foreign Application Priority Data
Jan. 13, 2016 (KR) .................. 10-2016-0004411

(51) Int. Cl.
*G02F 1/1335* (2006.01)
*G02F 1/21* (2006.01)
(Continued)

(52) U.S. Cl.
CPC ........ *G02F 1/133553* (2013.01); *G02F 1/137* (2013.01); *G02F 1/1337* (2013.01);
(Continued)

(58) Field of Classification Search
CPC ......... G02F 1/133553; G02F 1/133555; G02F 1/1337; G02F 1/134309; G02F 1/137;
(Continued)

(56) References Cited

U.S. PATENT DOCUMENTS 5,150,236 A * 9/1992 Patel ............... G02F 1/216
349/114
7,294,280 B2 11/2007 Sherrer et al.
(Continued)

FOREIGN PATENT DOCUMENTS

KR   10-2013-0054902 A   5/2013
WO   2015077127 A1   5/2015

OTHER PUBLICATIONS

Communication dated Jul. 10, 2017, issued by the European Patent Office in counterpart European Application No. 17150685.0.

*Primary Examiner* — Nathanael R Briggs
*Assistant Examiner* — William D Peterson
(74) *Attorney, Agent, or Firm* — Sughrue Mion, PLLC (57) ABSTRACT

Provided is a tunable electro-optic filter including a reflective structure including a first reflective layer including a first pattern layer having a first meta-surface structure disposed on a first side of the liquid crystal layer and a second reflective layer including a second pattern layer having a second meta-surface structure disposed on a second side of the liquid crystal layer. Each of the first meta-surface structure and the second meta-surface structure includes multiple dielectric materials which are alternately stacked, and a thickness of each dielectric material gradually increases. Alternately, the tunable electro-optic filter may include a pattern layer having a meta-surface structure disposed on at least a side of the liquid crystal layer.

16 Claims, 11 Drawing Sheets

(51) Int. Cl.
*G02F 1/1337* (2006.01)
*G02F 1/1343* (2006.01)
*G02F 1/137* (2006.01)

(52) U.S. Cl.
CPC ........ *G02F 1/134309* (2013.01); *G02F 1/216* (2013.01); *G02F 2201/307* (2013.01); *G02F 2201/346* (2013.01); *G02F 2203/06* (2013.01)

(58) Field of Classification Search
CPC ................. G02F 1/216; G02F 2203/06; G02F 2201/307; G02F 2201/346
USPC ....................................................... 349/113
See application file for complete search history.

(56) References Cited

U.S. PATENT DOCUMENTS

| | | |
|---|---|---|
| 7,826,504 B2 | 11/2010 | Chen et al. |
| 8,736,777 B2 | 5/2014 | Voigt et al. |
| 8,958,050 B2 | 2/2015 | Kholodnyak et al. |
| 2003/0002156 A1* | 1/2003 | Hobbs ............... G02F 1/133371 359/573 |
| 2007/0121210 A1 | 5/2007 | Sato |
| 2012/0170114 A1 | 7/2012 | Domash et al. |

* cited by examiner

TUNABLE ELECTRO-OPTIC FILTER

CROSS-REFERENCE TO RELATED APPLICATION

This application claims priority from Korean Patent Application No. 10-2016-0004411, filed on Jan. 13, 2016, in the Korean Intellectual Property Office, the disclosure of which is incorporated herein in its entirety by reference.

BACKGROUND

1. Field

Apparatuses consistent with exemplary embodiments relate to a tunable electro-optic filter using an electro-optic scheme.

2. Description of the Related Art

Tunable electro-optic filters are optical elements that modulate a spectrum of transmitted light or reflected light according to an applied voltage. Liquid crystal-based electro-optic filters usually employ a Lyot-Ohman scheme or a Fabry-Perot scheme.

An electro-optic filter using the Lyot-Ohman scheme includes polarizing plates respectively disposed in input and output units thereof and a liquid crystal-based phase retarder disposed between the polarizing plates. A polarization direction of light polarized by the polarizing plate in the input unit is rotated while passing through the phase retarder. A rotation angle is determined by a function depending on a wavelength of the light. As the polarized light passes through the polarizing plate of the output unit, a spectrum of the output light is modulated according to a wavelength. The liquid-crystal-based phase retarder includes multiple stages to modulate a transmissive wavelength band and bandwidth of light according to an applied voltage.

An electro-optic filter using the Fabry-Perot scheme includes a liquid crystal layer, a transparent electrode layer for applying a voltage to the liquid crystal layer, and a mirror layer. Upon application of a voltage to the liquid crystal layer, the refractive index of the liquid crystal layer and the path of light through the optical resonator change. Thus, the transmissive resonance wavelength of the light also changes.

SUMMARY

One or more exemplary embodiments may provide a tunable electro-optic filter having a broad variable wavelength range regardless of polarization.

One or more exemplary embodiments may provide a tunable electro-optic filter that operates independently of an interval between reflective plates.

One or more exemplary embodiments may provide a tunable electro-optic filter including reflective layers disposed on opposite sides of a liquid crystal layer or including a pattern layer disposed on at least one side of the liquid crystal layer.

Additional exemplary aspects will be set forth in part in the description which follows and, in part, will be apparent from the description, or may be learned by practice of the presented exemplary embodiments.

According to an aspect of an exemplary embodiment, a tunable electro-optic filter includes a liquid crystal layer, a first electrode layer disposed on a first side of the liquid crystal layer, a second electrode layer disposed on a second side of the liquid crystal layer, and a reflective structure including a first reflective layer disposed on the first side of the liquid crystal layer and a second reflective layer disposed on the second side of the liquid crystal layer, wherein each of the first reflective layer and the second reflective layer has a meta-surface structure.

Each of the first reflective layer and the second reflective layer may include a pattern layer having a meta-surface structure disposed on a surface of a transparent substrate The pattern layer may include a dielectric material or a metal.

The pattern layer may include a one-dimensional grating structure or a two-dimensional (2D) periodic/aperiodic pattern structure.

The pattern layer may have a circular shape, an oval shape, or a polygonal shape.

The pattern layer may include multiple patterns and a dielectric material or polymer filled between and among the multiple patterns.

The tunable electro-optic filter may further include a liquid crystal alignment layer disposed between the liquid crystal layer and the first electrode layer, and a liquid crystal alignment layer disposed between the liquid crystal layer and the second electrode layer.

A first outer substrate, the first electrode layer, and the first reflective layer may be sequentially disposed on the side of the liquid crystal layer onto which light is incident, and the second reflective layer, the second electrode layer, and a second outer substrate may be sequentially disposed on the second side of the liquid crystal layer opposite the side onto which the light is incident.

According to an aspect of another exemplary embodiment, a tunable electro-optic filter includes a liquid crystal layer, a pattern layer including a meta-surface structure in contact with a first side of the liquid crystal layer, a first electrode layer disposed on the first side of the liquid crystal layer, and a second electrode layer disposed on the second side of the liquid crystal layer.

A first liquid crystal alignment layer may be disposed on the first side of the liquid crystal layer, and the pattern layer may be disposed on the first liquid crystal alignment layer.

The pattern layer may be directly disposed on a surface of the first liquid crystal alignment layer and may include multiple patterns protruding inward toward the liquid crystal layer.

A refractive index of a first area of the liquid crystal layer near the pattern layer may be different from a refractive index of a second area of the liquid crystal layer, different from the first area.

A liquid crystal alignment layer may be disposed on each of the first and second sides of the liquid crystal layer, and a pattern layer may be disposed on each of the liquid crystal alignment layers.

According to an aspect of another exemplary embodiment, a tunable electro-optic filter includes a liquid crystal layer, a first electrode layer disposed on a first side of the liquid crystal layer, a second electrode layer disposed on a second side of the liquid crystal layer, and a reflective structure including a first reflective layer disposed on the first side of the liquid crystal layer and a second reflective layer disposed on the second side of the liquid crystal layer, wherein each of the first reflective layer and the second reflective layer includes a structure in which at least two dielectric material layers having different thicknesses are alternately stacked.

Thicknesses of the dielectric material layers of the first reflective layer and of the second reflective layer may increase in a direction from a light-incident side of the filter to a light-output side of the filter.

The first reflective layer may include multiple layers in which different dielectric materials are alternately stacked, and thicknesses of the multiple layers of the first reflective layer may increase in a direction from a light-incident side of the filter to a light-output side of the filter.

The second reflective layer may include multiple layers in which different dielectric materials are alternately stacked, and thicknesses of the multiple layers of the second reflective layer may increase in the direction from the light-incident side of the filter to the light-output side of the filter.

Reflective phase gradients of the first reflective layer and the second reflective layer may be opposite to each other.

BRIEF DESCRIPTION OF THE DRAWINGS

These and/or other exemplary aspects and advantages will become apparent and more readily appreciated from the following description of the exemplary embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

Hereinafter, exemplary embodiments will be described with reference to the accompanying drawings. Throughout the drawings, like reference numerals refer to like elements, and each element may be exaggerated in size for clarity and convenience of a description. Meanwhile, the following exemplary embodiments are merely illustrative, and various modifications may be possible from the exemplary embodiments. In a layer structure described below, an expression such as "above" or "on" may include not only the meaning of "immediately on in a contact manner", but also the meaning of "on in a non-contact manner".

Figure 1:
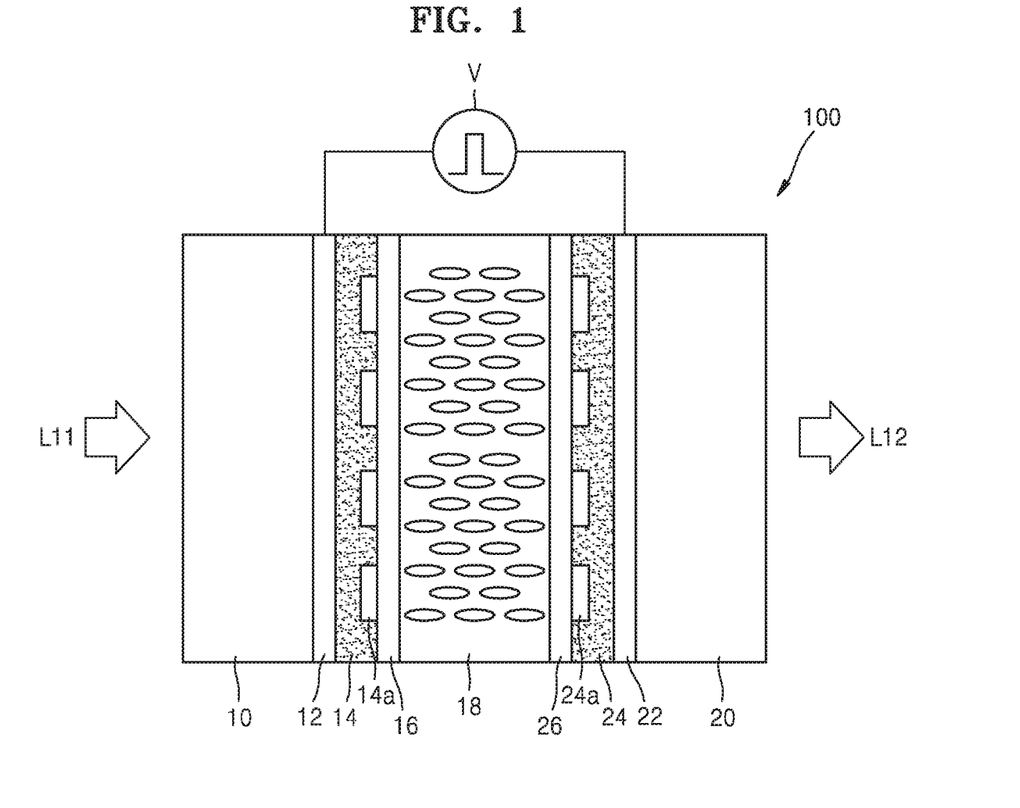
FIG. 1 is a cross-sectional view of a tunable electro-optic filter according to an exemplary embodiment.

FIG. 1 is a cross-sectional view of a tunable electro-optic filter according to an exemplary embodiment.

Referring to FIG. 1, a tunable electro-optic filter 100 according to an exemplary embodiment may have a structure including reflection structures disposed on opposite sides of a liquid crystal layer 18. A first substrate 10, a first electrode layer 12, and a first reflective layer 14 and 14a may be formed on a side of the liquid crystal layer 18 onto which light L11 is incident. A second reflective layer 24 and 24a, a second electrode layer 22, and a second substrate 20 may be formed on another side of the liquid crystal layer 18 through which the light L11 passes after being modulated in the tunable electro-optic filter 100. A first liquid crystal alignment layer 16 is formed between the liquid crystal layer 18 and the first reflective layer 14 and 14a, and a second liquid crystal alignment layer 26 is formed between the liquid crystal layer 18 and the second reflective layer 24 and 24a.

A voltage applying unit V is electrically connected to the first electrode layer 12 and the second electrode layer 22 on opposite sides of the liquid crystal layer 18, and applies a voltage to the liquid crystal layer 18 through the first electrode layer 12 and the second electrode layer 22.

The tunable electro-optic filter 100 according to an exemplary embodiment may include the first reflective layer 14 and 14a and the second reflective layer 24 and 24a which are formed on the opposite sides of the liquid crystal layer 18, respectively. The first reflective layer 14 and 14a and the second reflective layer 24 and 24a together form an optical resonator structure. At least one of the first reflective layer 14 and 14a and the second reflective layer 24 and 24a may have a meta-surface structure. More specifically, the meta-surface structure may include multiple patterns including a dielectric material or a metallic material having a one-dimensional grating structure or a two-dimensional (2D) structure on a substrate.

The first reflective layer 14 and 14a may include a substrate 14 and a pattern layer 14a formed on a surface of the substrate 14, and the second reflective layer 24 and 24a may include a substrate 24 and a pattern layer 24a formed on a surface of the substrate 24. The pattern layers 14a and 24a may be formed by depositing a dielectric material or a metallic material on the surfaces of the transparent substrates 14 and 24, respectively, and then performing patterning into a desired form. The pattern layers 14a and 24a may include multiple patterns having various shapes, and a size or shape of each pattern, and intervals between patterns are not limited particularly. Each of the pattern layers 14a and 24a may comprises patterns having at least one of a circular shape, an oval shape, and a polygonal shape. The patterns of the pattern layers 14a and 24a may be formed with periodic or aperiodic intervals therebetween. The patterns of the pattern layers 14a and 24a may be formed to have a one-dimensional grating structure or a 2D periodic/aperiodic structure.

By using the first reflective layer 14 and 14a and the second reflective layer 24 and 24a formed for a meta-surface structure of a tunable electro-optic filter according to the present disclosure, an optical resonator is implemented. The first reflective layer 14 and 14a and the second reflective layer 24 and 24a are formed symmetrically such that the first reflective layer 14 and 14a face the second reflective layer 24 and 24a with respect to the liquid crystal layer 18. Materials, pattern shapes, and a pattern intervals of the pattern layers 14a and 24a forming the meta-surface structure may be adjusted to control reflectivity corresponding to a wavelength of light and a phase delay at the time of reflection.

FIGS. 2A through 2D illustrate various forms of an exemplary reflective layer having a meta surface in a tunable electro-optic filter according to an exemplary embodiment.

Figure 2A:
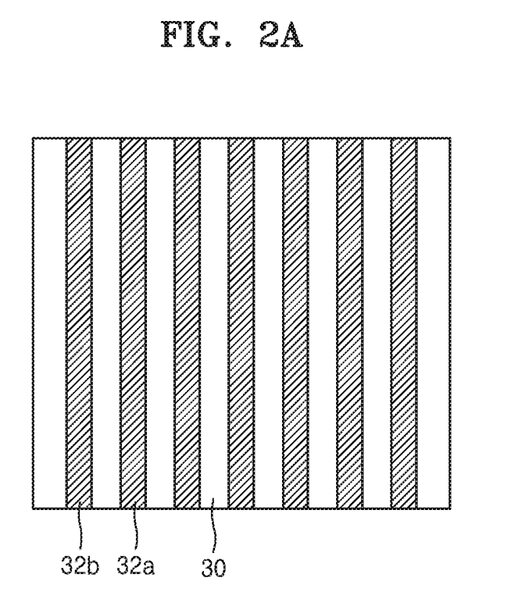
FIGS. 2A, 2B, 2C, and 2D illustrate various forms of a reflective layer having a meta surface in a tunable electro-optic filter according to an exemplary embodiment.
Figure 2B:
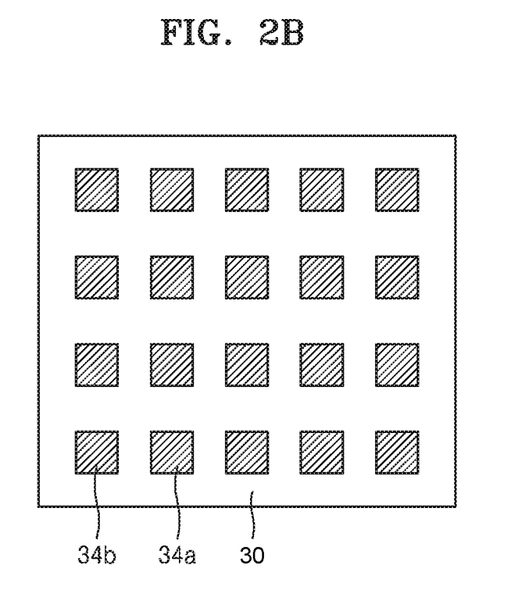
Figure 2C:
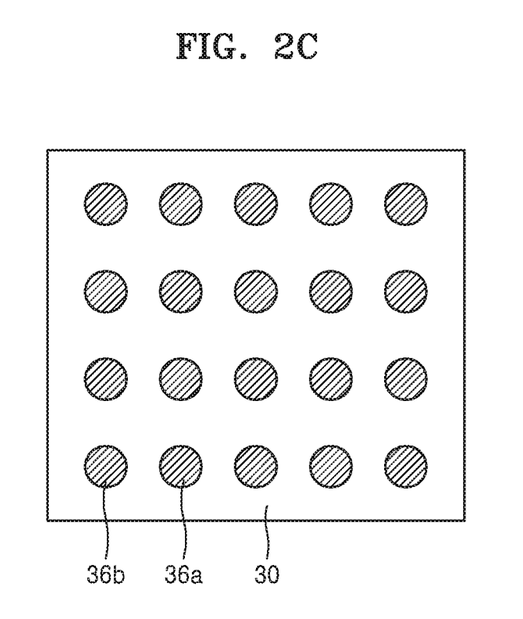

Referring to FIGS. 2A through 2D, multiple patterns 32a, 32b, 34a, 34b, 36a, 36b, 38a, and 38b are formed on a substrate 30. In FIG. 2A, straight-line patterns 32a and 32b formed in a direction are formed to be recessed into the substrate 30. The patterns 32a and 32b are formed in parallel with each other, having an interval therebetween. In FIGS. 2B and 2C, rectangular patterns 34a and 34b and circular patterns 36a and 36b are formed to be aligned at particular intervals therebetween. As such, a meta-surface structure of a reflective layer of a tunable electro-optic filter according to an exemplary embodiment may include the patterns 32a, 32b, 34a, 34b, 36a, 36b, 38a, and 38b having particular shapes and intervals on the substrate 30.

Figure 2D:
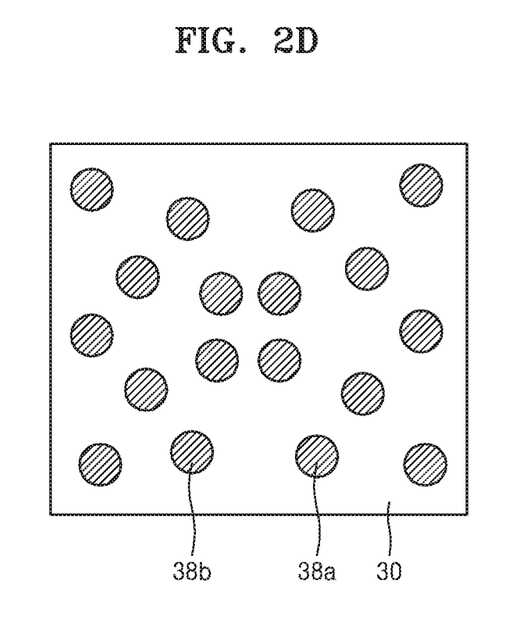

As shown in FIG. 2D, the meta-surface structure of a reflective layer of a tunable electro-optic filter according to an exemplary embodiment may include the circular patterns 38a and 38b formed on the substrate 30 at random, without any periodic interval therebetween. In this way, the meta-surface structure of the reflective layer of the tunable electro-optic filter according to an exemplary embodiment may be designed and selected by a user of the electro-optic filter. Sizes, intervals, and heights of the multiple patterns 32a, 32b, 34a, 34b, 36a, 36b, 38a, and 38b formed on the substrate 30 may be properly selected without being limited particularly.

Referring back to FIG. 1, when the pattern layers 14a and 24a are respectively formed on the surfaces of the substrates 14 and 24, the pattern layers 14a and 24a are recessed into the surfaces of the substrates 14 and 24 to form the resultant concave-convex cross-sections of the first reflective layer 14 and 14a and the second reflective layer 24 and 24a. To form the first liquid crystal alignment layer 16 and the second liquid crystal alignment layer 26 on the pattern layers 14a and 24a before forming the liquid crystal layer 18, a dielectric material that is different from a material of the pattern layers 14a and 24a, or polymer is filled between the pattern layers 14a and 24a for planarization of the surfaces of the first reflective layer 14 and 14a and the second reflective layer 24 and 24a. Protruding heights of the portions of the substrates 14 and 24 surrounding the patterns layer 14a and 24a may be selected arbitrarily.

In the tunable electro-optic filter 100 according to an exemplary embodiment, for the liquid crystal alignment layers 16 and 26 and the liquid crystal layer 18, a liquid crystal alignment material and a liquid crystal material, as typically used in an optical filter may be used. For example, the liquid crystal alignment layers 16 and 26 may include a polymer material including a high-polymer compound. For example, the liquid crystal alignment layers 16 and 26 may include polyimide, polyester, an acrylic compound, an epoxy compound, a urethane compound, or the like. The liquid crystal layer 18 may include a liquid crystal compound aligned by the liquid crystal alignment layers 16 and 26.

The first substrate 10 and the second substrate 20 may include any substrate material as typically used in an optical filter. The first substrate 10 and the second substrate 20 may include any material having excellent light transmittance with respect to the light L11 intended to be incident on the device and the light L12 intended to be emitted from the device, such as a transparent dielectric material like glass, $SiO_2$, or the like. The first electrode layer 12 and the second electrode layer 22 may include a transparent conductive material such as indium tin oxide (ITO), or any transparent electrode material generally used in an optical filter.

Figure 3A:
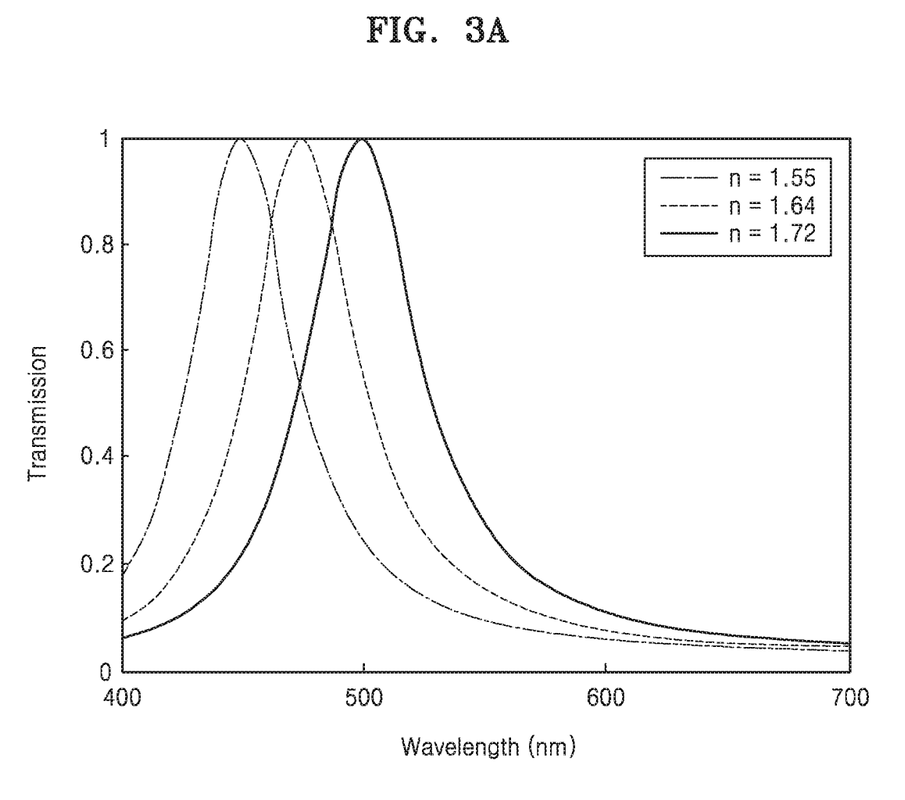
FIGS. 3A, 3B, and 3C are graphs showing a change in a transmission spectrum of the tunable electro-optic filter shown in FIG. 1 with respect to a change in a reflective phase gradient in a visible wavelength range, according to an exemplary embodiment.
Figure 3B:
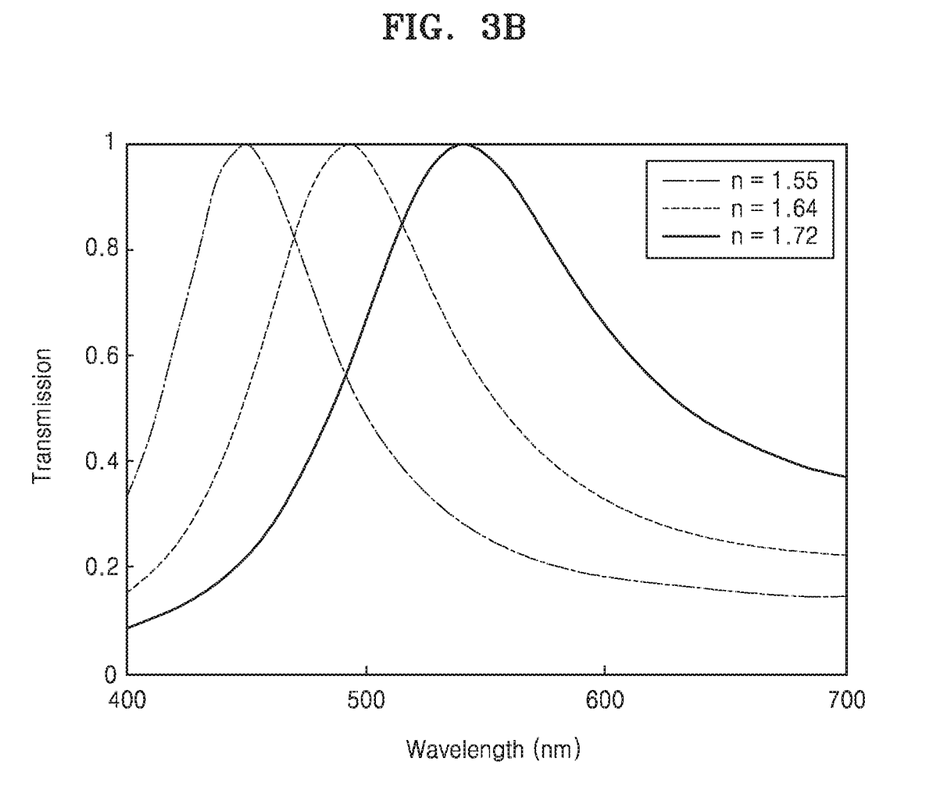
Figure 3C:
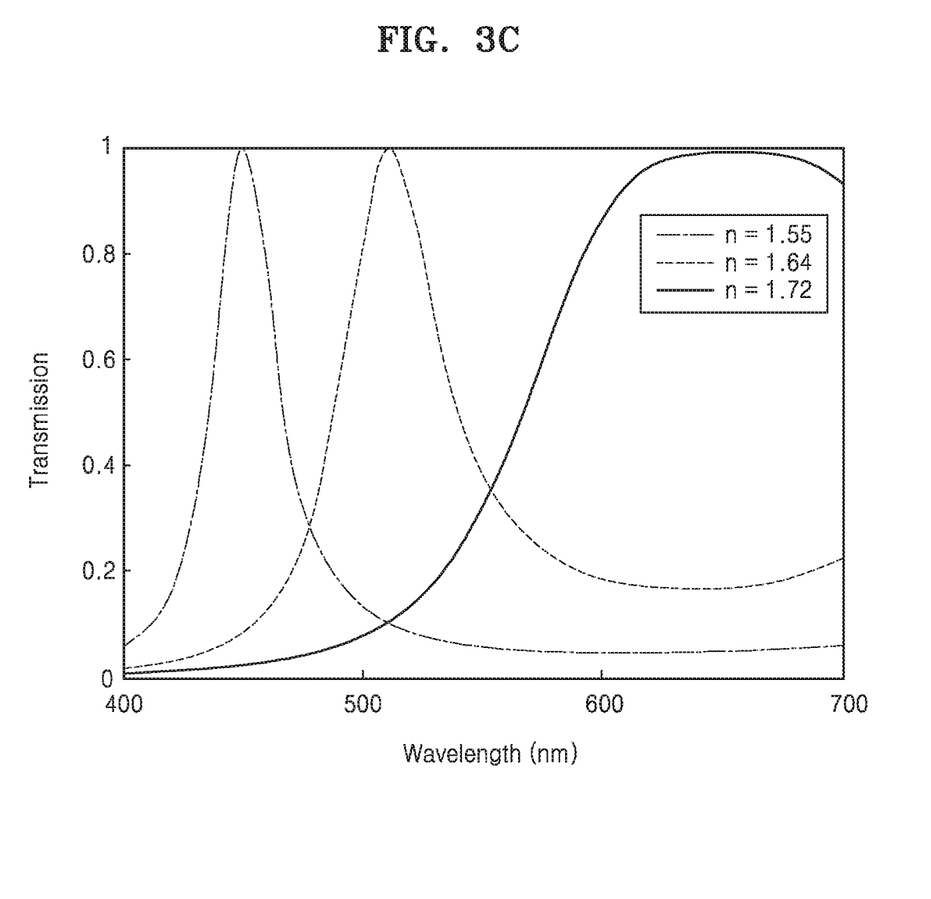

FIGS. 3A through 3C are graphs showing a change in a transmission spectrum of the tunable electro-optic filter shown in FIG. 1 according to an exemplary embodiment with respect to a change in a reflective phase gradient in a visible wavelength range. Herein, FIGS. 3A through 3C show a change in the transmission spectrum of the tunable electro-optic filter according to an exemplary embodiment when a reflectivity R of the first reflective layer 14 and 14a, a reflectivity R of the second reflective layer 24 and 24a, and a reflective phase gradient indicating a phase change with respect to a wavelength, change in a visible wavelength range of 400 nm to 700 nm.

Referring to FIGS. 3A through 3C, when a refractive index of the liquid crystal layer 18 changes to n=1.55, 1.64, and 1.72, in that order, a peak wavelength moves from 450 nm to a wavelength of greater than 500 nm. Although a maximum variable wavelength range is about 50 nm when the reflective phase gradient is 0 as shown in FIG. 3A, the maximum variable wavelength range may be further extended to about 100 nm if the reflective phase gradient is about 2.67 mrad/nm as shown in FIG. 3B. If the reflectivity R is 0.9 and the reflective phase gradient is about 3.67 mrad/nm as shown in FIG. 3C, the maximum variable wavelength range may reach about 200 nm. As such, by controlling a reflective phase based on formation of the meta-surface structures for the first reflective layer 14 and 14a and the second reflective layer 24 and 24a of the tunable electro-optic filter according to an exemplary embodiment, the degree of freedom to modulate a transmission spectrum may be improved greatly.

Figure 4:
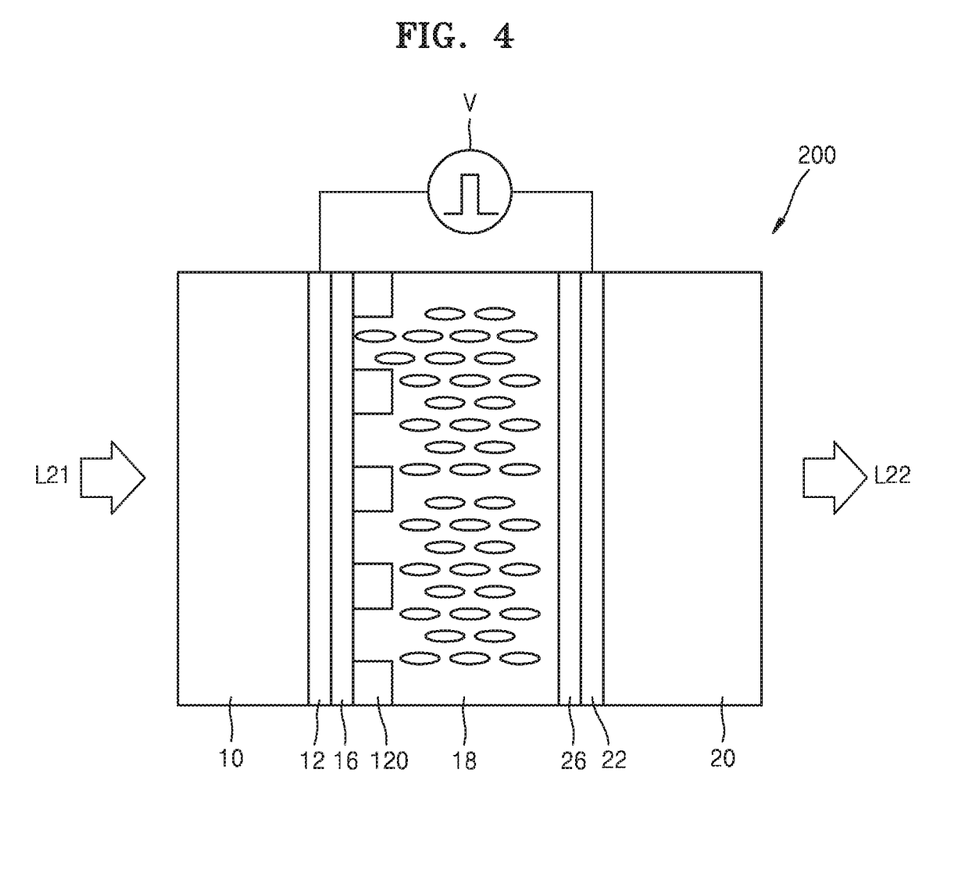
FIG. 4 is a cross-sectional view of a tunable electro-optic filter including a pattern layer formed on a side of a liquid crystal layer and having a meta surface structure, according to an exemplary embodiment.
Figure 5:
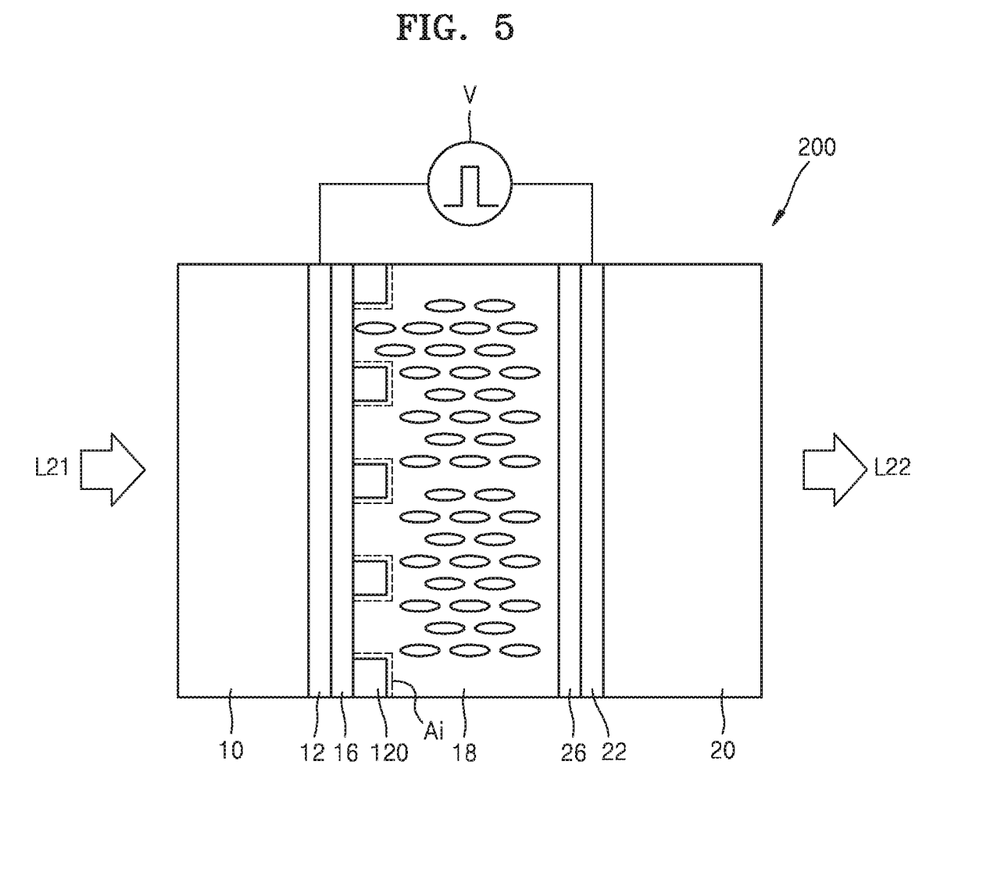
FIG. 5 is a cross-sectional view showing a change in a refractive index of a liquid crystal layer around a pattern layer in the tunable electro-optic filter shown in FIG. 4.

FIG. 4 is a cross-sectional view of a tunable electro-optic filter in which a pattern layer having a meta surface structure is formed on a side of a liquid crystal layer according to an exemplary embodiment. FIG. 5 is a cross-sectional view showing a change in a refractive index of a liquid crystal layer around a pattern layer in a tunable electro-optic filter shown in FIG. 4.

Referring to FIG. 4, a tunable electro-optic filter 200 according to an exemplary embodiment includes a first pattern layer 120 formed on one side of the liquid crystal layer 18. On a side of the liquid crystal layer 18 to which the light L11 is incident, the first substrate 10, the first electrode layer 12, and the first liquid crystal alignment layer 16 are formed. A first pattern layer 120 is formed on the surface of the first liquid crystal alignment layer 16 and protrudes inward toward the liquid crystal layer 18. The first pattern layer 120 may include any one or more of the patterns 32a, 32b, 34a, 34b, 36a, 36b, 38a, and 38b as shown in FIGS. 2A through 2D. In the tunable electro-optic filter 100 shown in FIG. 1, the first reflective layers 14 and 14a and the second reflective layers 24 and 24a that face each other are formed on opposite sides of the liquid crystal layer 18 to form an optical resonator structure. On the other hand, as shown in FIG. 4, the first pattern layer 120 may be formed on a side of the liquid crystal layer 18 for operation in a non-resonance manner.

Referring to FIG. 5, the liquid crystal layer 18 may have a first refractive index No if a voltage is applied from the voltage applying unit V to the liquid crystal layer 18 through the first electrode layer 12 and the second electrode layer 22, and the liquid crystal layer 18 in a nearby area Ai of the first pattern layer 120 may have a second refractive index Ne that is different from the first refractive index No or may have a refractive index between the first refractive index No and the second refractive index Ne. That is, the refractive index of the liquid crystal layer 18 in the nearby area Ai of the first pattern layer 120 having a meta-surface structure changes to be different from a refractive index of the liquid crystal layer 18 in an area that is different from the nearby area Ai of the first pattern layer 120.

When light L21, incident on the tunable electro-optic filter 200 according to an exemplary embodiment, passes through the liquid crystal layer 18, the light L21 undergoes a change in a transmittance thereof as a liquid crystal refractive index of the liquid crystal layer 18 changes, and then the light L21 is emitted as light L22. As such, the tunable electro-optic filter 200 according to an exemplary embodiment shown in FIG. 4 uses a light scattering phenomenon that varies with a nearby refractive index change of the first pattern layer 120 having the meta-surface structure.

Figure 6:
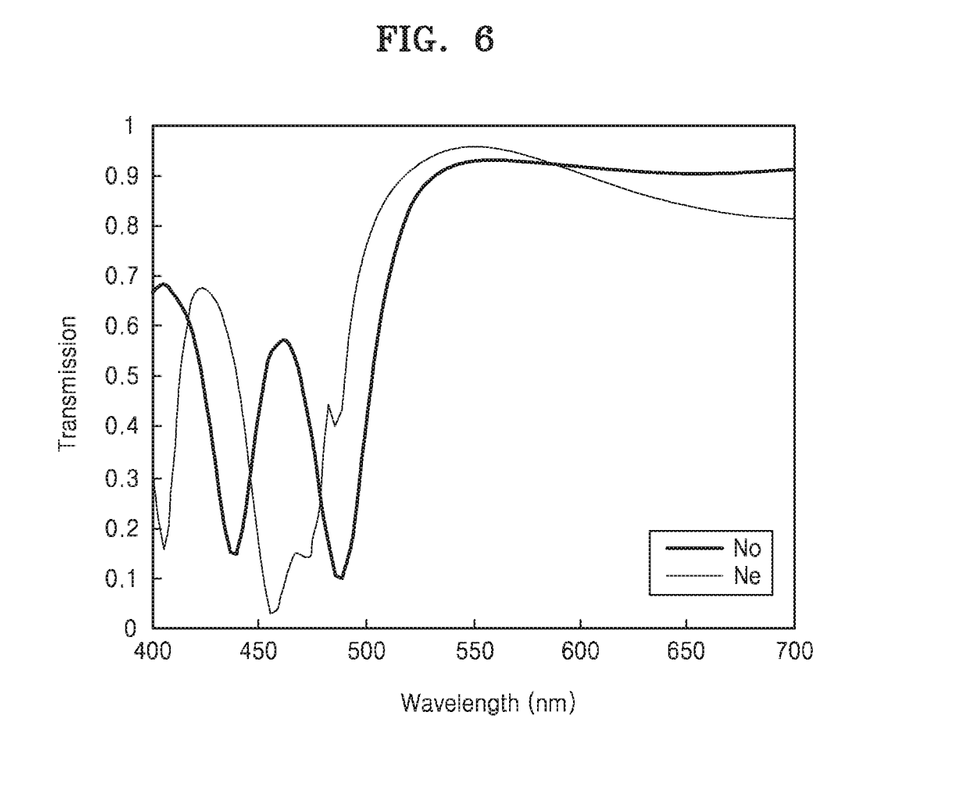
FIG. 6 is a graph showing a change in a transmission spectrum of the tunable electro-optic filter shown in FIG. 4.

FIG. 6 is a graph showing a change in a transmission spectrum of the tunable electro-optic filter shown in FIG. 4.

Referring to FIGS. 5 and 6, the first pattern layer 120 is formed on a side of the liquid crystal layer 18 having the first refractive index No, and the liquid crystal layer 18 in the nearby area Ai of the first pattern layer 120 may have, for example, the second refractive index Ne. As such, when a refractive index changes with an area of the liquid crystal layer 18, the transmission spectrum of the light L21 may change as shown in FIG. 6. In FIG. 6, the transmission changes largely with a liquid crystal refractive index near a wavelength of the light L21 of about 460 nm. The tunable electro-optic filter 200 according to an exemplary embodiment depends on changes in the refractive indices of the first pattern layer 120 having the meta-surface structure and of the nearby area Ai of the first pattern layer 120, thereby preventing a transmission wavelength from changing sensitively with respect to a resonator interval as in a conventional Fabry-Perot scheme.

Figure 7:
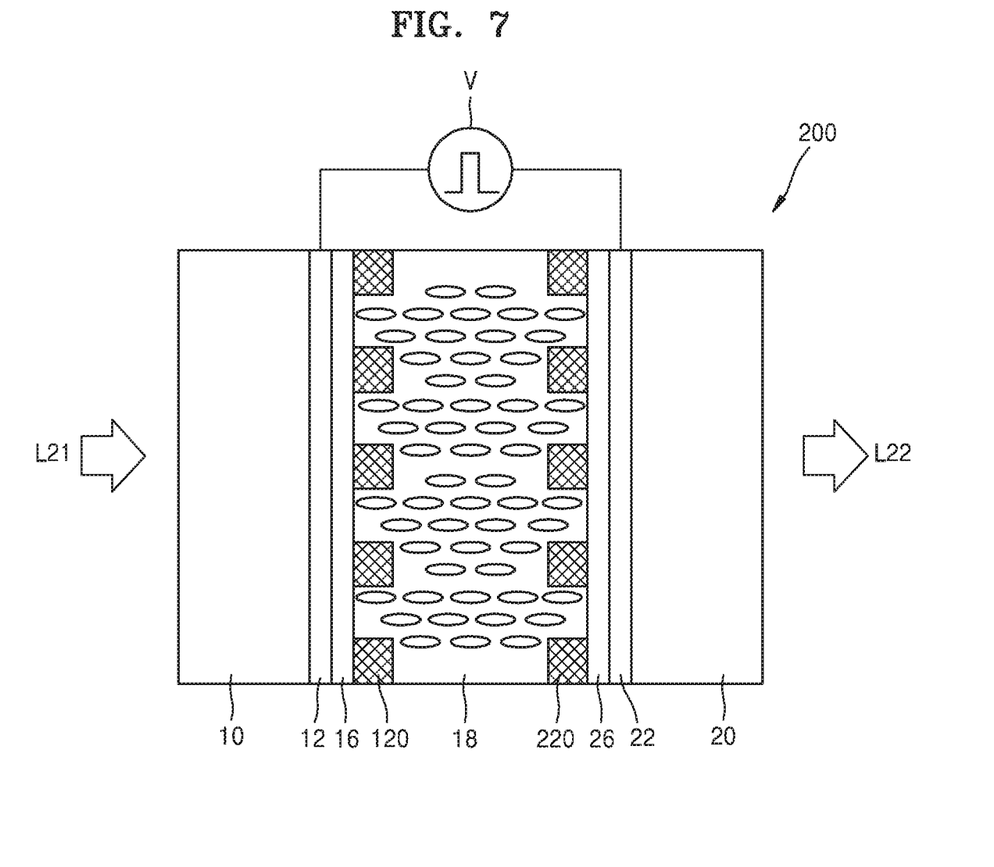
FIG. 7 is a cross-sectional view of the tunable electro-optic filter shown in FIG. 4, which includes pattern layers directly formed on opposite sides of a liquid crystal layer and having the meta surface structure, according to an exemplary embodiment.

FIG. 7 is a cross-sectional view of the tunable electro-optic filter shown in FIG. 4 in which pattern layers having the meta surface structure are directly formed on opposite sides of a liquid crystal layer according to an exemplary embodiment.

Referring to FIG. 7, the tunable electro-optic filter 200 according to an exemplary embodiment may include the first pattern layer 120 and a second pattern layer 220 formed on opposite sides of the liquid crystal layer 18. On a side of the liquid crystal layer 18 to which the light L11 is incident, the first substrate 10, the first electrode layer 12, and the first liquid crystal alignment layer 16 are formed. On the surface of the first liquid crystal alignment layer 16, the first pattern layer 120 protrudes away from the surface of the first liquid crystal alignment layer 16. On another side of the liquid crystal layer 18 from which light L22 is emitted, the second substrate 20, the second electrode layer 22, and the second liquid crystal alignment layer 26 are formed, and the second pattern layer 220 is formed on the surface of the second liquid crystal alignment layer 26. The second pattern layer 220 protrudes from the surface of the second liquid crystal alignment layer 26 toward the liquid crystal layer 18.

As such, the first pattern layer 120 and the second pattern layer 220 are formed directly on the surfaces of the first liquid crystal alignment layer 16 and the second liquid crystal alignment layer 26, respectively, in such a way as to protrude inward toward the liquid crystal layer 18. The first pattern layer 120 and the second pattern layer 220 face each other with respect to the liquid crystal layer 18 to form an optical resonator structure. The first pattern layer 120 and the second pattern layer 220 may include any one or more of the patterns 32a, 32b, 34a, 34b, 36a, 36b, 38a, and 38b having the shapes and the arrangement as shown in FIGS. 2A through 2D.

Figure 8:
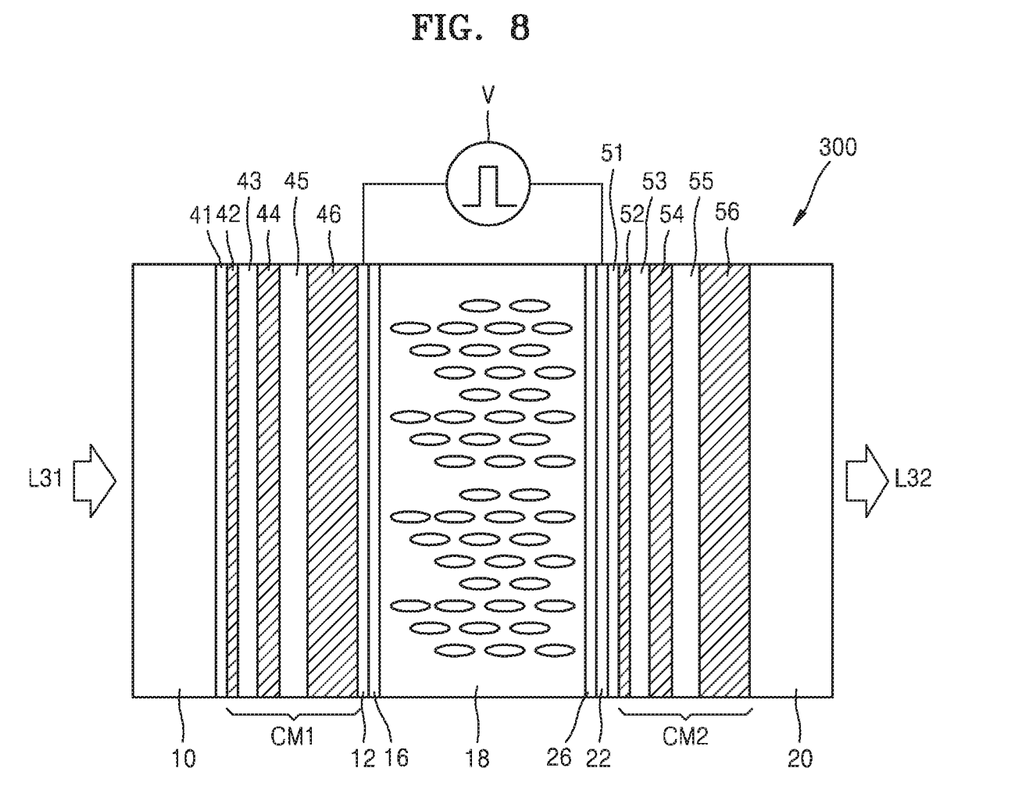
FIG. 8 is a cross-sectional view of a tunable electro-optic filter according to another exemplary embodiment.

FIG. 8 is a cross-sectional view of a tunable electro-optic filter according to another exemplary embodiment.

Referring to FIG. 8, a tunable electro-optical filter 300 includes a reflective structure formed on opposite sides of the liquid crystal layer 18. On a side of the liquid crystal layer 18 to which light L31 is incident, the first substrate 10, a first reflective layer CM1, and the first electrode layer 12 are formed. The first liquid crystal alignment layer 16 is formed between the first electrode layer 12 and the liquid crystal layer 18. On another side of the liquid crystal layer 18 from which the light L31, modulated by the tunable electro-optical filter 300, is emitted, the second electrode layer 22, a second reflective layer CM2, and the second substrate 20 are formed. The second liquid crystal alignment layer 26 is formed between the liquid crystal layer 18 and the second electrode layer 22.

The first reflective layer CM1 and the second reflective layer CM2 of the tunable electro-optic filter 300 shown in FIG. 8 may each include a dielectric material having a multi-layer structure. For example, the first reflective layer CM1 and the second reflective layer CM2 may each include one or more of Si oxide, Si nitride, Ti oxide, Hf oxide, Al oxide, Zn oxide, and the like. The first reflective layer CM1 and the second reflective layer CM2 may each have a multi-layer structure in which different materials are formed alternately.

That is, the first reflective layer CM1 and the second reflective layer CM2 may each have a structure in which a first dielectric material and a second dielectric material are stacked alternately. For example, the first reflective layer CM1 and the second reflective layer CM2 may each have a structure in which Si oxide and Ti oxide are stacked alternately. The first reflective layer CM1 and the second reflective layer CM2 may each have a structure in which two or more different material layers are stacked alternately. In each of the first reflective layer CM1 and the second reflective layer CM2, two or more material layers may be stacked alternately such that the thickness of each stacked material layer changes in a direction of the passage of light through the layer or in a direction opposite the direction of the passage of light through the layer.

As shown in FIG. 8, the first reflective layer CM1 may include multiple material layers including a first layer 41 through a sixth layer 46, in which the first layer 41, a third layer 43, and a fifth layer 45 each include a first dielectric material, and a second layer 42, a fourth layer 44, and the sixth layer 46 each include a second dielectric material. Thicknesses of the material layers may increase in a direction from the first layer 41, on which the light L31 is incident, to the sixth layer 46, closer to the liquid crystal layer 18.

The second reflective layer CM2 includes multiple material layers including a first layer 51 through a sixth layer 56, in which the first layer 51, a third layer 53, and a fifth layer 55 each include the first dielectric material, and a second layer 52, a fourth layer 54, and the sixth layer 56 each include the second dielectric material. Thicknesses of the material layers may increase in a direction from the first layer 51, closer to the liquid crystal layer 18 to the sixth layer 56, through which the light L32 is emitted from the tunable electro-optical filter 300.

The first through sixth layers 41, 42, 43, 44, 45, and 46 of the first reflective layer CM1 may have thicknesses decreasing in a direction away from the liquid crystal layer 18, and the first through sixth layers 51, 52, 53, 54, 55, and 56 of the second reflective layer CM2 may have thicknesses increasing in the direction away from the liquid crystal layer 18.

As such, each of the first reflective layer CM1 and the second reflective layer CM2 may have a multi-layer structure in which different dielectric materials are stacked alternately. The thickness of each layer included in each of the first reflective layer CM1 and the second reflective layer CM2 may increase in a direction from a side through which the light L31 is incident to a side through which the light L32 is emitted. The first reflective layer CM1 and the second reflective layer CM2 structured as described above may, together, form an optical resonator structure. Together, the first reflective layer CM1 and the second reflective layer CM2 structured as described above may be referred to as a chirped mirror of a stacked type.

The first reflective layer CM1 and the second reflective layer CM2 are not shaped to be symmetric to each other with respect to the liquid crystal layer 18 and have opposite reflective phase gradients because of having opposite polarities. The tunable electro-optic filter 300 shown in FIG. 8 may be designed to have a user-desired reflective phase through the addition of the opposite-sign reflective phase gradients of the first reflective layer CM1 and the second reflective layer CM2.

According to one or more exemplary embodiments described herein, a reflective phase is controlled by forming a reflective structure having the meta-surface structure on opposite sides of the liquid crystal layer, thereby improving a degree of freedom to modulate a transmission spectrum. Moreover, by forming a pattern layer having the meta-surface structure on at least a side of the liquid crystal layer, a transmission wavelength is prevented from changing sensitively with respect to a resonator interval. Furthermore, multiple dielectric materials having differing thicknesses are provided on opposite sides of the liquid crystal layer as a reflective structure, thereby providing an electro-optic filter having a user-desired reflective phase.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A tunable electro-optic filter comprising:
    a liquid crystal layer;
    a first electrode layer disposed on a first side of the liquid crystal layer and a second electrode layer disposed on a second side of the liquid crystal layer; and
    a reflective structure comprising a first reflective layer disposed on the first side of the liquid crystal layer and a second reflective layer disposed on the second side of the liquid crystal layer,
    wherein the first reflective layer comprises a first pattern layer, having a meta-surface structure,
    wherein the first reflective layer comprises a first transparent substrate disposed between the first pattern layer and the first electrode layer,
    wherein the first transparent substrate and the first pattern layer configure a multilayer structure,
    wherein the second reflective layer comprises a second transparent substrate disposed between a second pattern layer and the second electrode layer, and
    wherein the second transparent substrate and the second pattern layer configure a multilayer structure.

2. The tunable electro-optic filter of claim 1, wherein:
    the second reflective layer comprises the second pattern layer, having a meta-surface structure,
    the second pattern layer comprises one of a one-dimensional grating structure, a 2D periodic pattern structure, and a 2D aperiodic pattern structure.

3. The tunable electro-optic filter of claim 1, wherein the first pattern layer comprises one of a dielectric material and a metal.

4. The tunable electro-optic filter of claim 1, wherein the first pattern layer comprises patterns having at least one of a circular shape, an oval shape, and a polygonal shape.

5. The tunable electro-optic filter of claim 1, wherein the first pattern layer comprises a plurality of patterns and one of a dielectric material and polymer filled between and among the plurality of patterns.

6. The tunable electro-optic filter of claim 1, further comprising a first liquid crystal alignment layer disposed between the liquid crystal layer and the first electrode layer, and a second liquid crystal alignment layer disposed between the liquid crystal layer and the second electrode layer.

7. The tunable electro-optic filter of claim 1, further comprising a first outer substrate and a second outer substrate, wherein:
    the first outer substrate, the first electrode layer, and the first reflective layer are sequentially on a light-incident side of the liquid crystal layer, and
    the second reflective layer, the second electrode layer, and the second outer substrate are sequentially disposed on a light-output side of the liquid crystal layer.

8. A tunable electro-optic filter comprising:
    a liquid crystal layer;
    a first liquid crystal alignment layer disposed on a first side of the liquid crystal layer;
    a pattern layer comprising a meta-surface structure, the pattern layer being provided between a first side of the liquid crystal layer and the first liquid crystal alignment layer;
    a first electrode layer disposed on the first side of the liquid crystal layer; and
    a second electrode layer disposed on a second side of the liquid crystal layer,
    wherein the pattern layer comprises a one-dimensional grating structure.

9. The tunable electro-optic filter of claim 8, further comprising:
    a second liquid crystal alignment layer disposed on the second side of the liquid crystal layer opposite to the first side,
    wherein the pattern layer is disposed on the first liquid crystal alignment layer.

10. The tunable electro-optic filter of claim 9, wherein the pattern layer is directly disposed on a surface of the first liquid crystal alignment layer and comprises a plurality of patterns protruding toward the liquid crystal layer.

11. The tunable electro-optic filter of claim 10, wherein a refractive index of a first area of the liquid crystal layer near the pattern layer is different from a refractive index of a second area of the liquid crystal layer different from the first area.

12. The tunable electro-optic filter of claim 8, further comprising:
- a second liquid crystal alignment layer disposed on the second side of the liquid crystal layer, and
- a second pattern layer comprising a meta-surface structure provided between the second side of the liquid crystal layer and the second liquid crystal alignment layer.

13. A tunable electro-optic filter comprising:
- a liquid crystal layer;
- a first electrode layer disposed on a first side of the liquid crystal layer, and a second electrode layer disposed on a second side of the liquid crystal layer; and
- a reflective structure comprising a first reflective layer disposed on the first side of the liquid crystal layer and a second reflective layer disposed on the second side of the liquid crystal layer,
- wherein the first reflective layer comprises a structure in which at least two dielectric material layers having different thicknesses are alternately stacked, and the second reflective layer comprises a structure in which the at least two dielectric material layers are alternately stacked; and
- wherein respective thicknesses of the at least two dielectric material layers of the first reflective layer increase in a direction from a light-incident side of the tunable electro-optic filter to a light-output side of the tunable electro-optic filter.

14. The tunable electro-optic filter of claim 13, wherein the respective thicknesses of the at least two dielectric material layers of the second reflective layer increase in the direction from the light-incident side of the tunable electro-optic filter to a light-output side of the tunable electro-optic filter.

15. The tunable electro-optic filter of claim 13, wherein a reflective phase gradient of the first reflective layer is opposite a reflective phase gradient of the second reflective layer.

16. The tunable electro-optic filter of claim 1, wherein the first pattern layer comprises one of a one-dimensional grating structure, a two-dimensional (2D) periodic pattern structure, and a 2D aperiodic pattern structure.

* * * * *